United States Patent [19]

McConnell

[11] Patent Number: 4,594,122
[45] Date of Patent: Jun. 10, 1986

[54] APPARATUS FOR PREPARING A CONTOURED PREFORM

[75] Inventor: Ronald F. McConnell, West Chester, Pa.

[73] Assignee: E. I. Du Pont De Nemours and Company, Wilmington, Del.

[21] Appl. No.: 705,912

[22] Filed: Feb. 26, 1985

[51] Int. Cl.⁴ .............................................. B32B 5/02
[52] U.S. Cl. ......................................... 156/433; 249/65
[58] Field of Search .............. 156/433, 441, 425, 156, 156/166, 169, 173, 175, 290; 249/65, 78; 264/278, 275, 277, 314, 316, 251, 258; 415/440

[56] References Cited

U.S. PATENT DOCUMENTS

| | | | |
|---|---|---|---|
| 3,158,907 | 12/1964 | Pavicevic | 249/65 |
| 3,577,294 | 5/1971 | David | 156/173 |
| 3,772,126 | 11/1973 | Myers | 156/441 |
| 4,060,445 | 11/1977 | Houck et al. | 156/414 |
| 4,137,354 | 1/1979 | Mayes et al. | 156/175 |
| 4,199,388 | 4/1980 | Tracy et al. | 156/166 |

FOREIGN PATENT DOCUMENTS 0110698 6/1984 European Pat. Off. .
3003666 8/1981 Fed. Rep. of Germany .

*Primary Examiner*—Michael Ball

[57] ABSTRACT

A form on which a strand is wound according to a pattern desired for the reinforcement of a contoured plastic composite. The form has a similarly contoured, apertured surface and retractable pins projecting from the apertures. The pattern is fused at cross-over points and can then be used as a preform.

9 Claims, 6 Drawing Figures

APPARATUS FOR PREPARING A CONTOURED PREFORM

BACKGROUND

This invention relates generally to reinforced, plastic composites and, more particularly, to the preparation of preforms which are useful in the fabrication of such composites.

Plastic composites having contoured shapes and surfaces are known in the art. For example, since the advent of ultra-high strength aramid fibers, protective helmets have been made by laminating woven fabrics impregnated with a resin as a binder and heat curing the laminate in a mold of the desired shape. In U.S. Pat. No. 4,199,388, Tracy et al. recognized the expense of composites reinforced by fabrics and disclosed an alternate route involving the preparation of plural preforms The preforms can be nested and molded into the desired shape. Each preform includes a screen onto which a strand of fibers is deposited randomly from an air gun. The disadvantages of such a contoured composite are the lack of precision in the deposition of reinforcing fibers in each preform and the absence of uniformity between the preforms.

In German Pat. No. 3,003,666, the possibility of arranging the reinforcement for a composite structure on an arched table is disclosed. Such a table and an array of pins are shown in FIG. 9. According to the description, a reinforcing strand would be wound, in aligned rows, between opposed pins.

SUMMARY

The object of the present invention is to provide an apparatus with which a preform for a contoured, reinforced, plastic composite can be wound accurately, automatically, expeditiously and in an ordered fashion. That objective has been met in an apparatus with which a continuous strand is wound on a hollow form having a similarly contoured surface provided with multiple apertures. Within the form, there is an inflatable diaphragm. A plurality of pins project from the diaphragm into the apertures. When the diaphragm is inflated, the pins project from the form and present a bed into which the strand can be deposited according to a desired pattern.

DRAWINGS

DESCRIPTION

Figure 1:
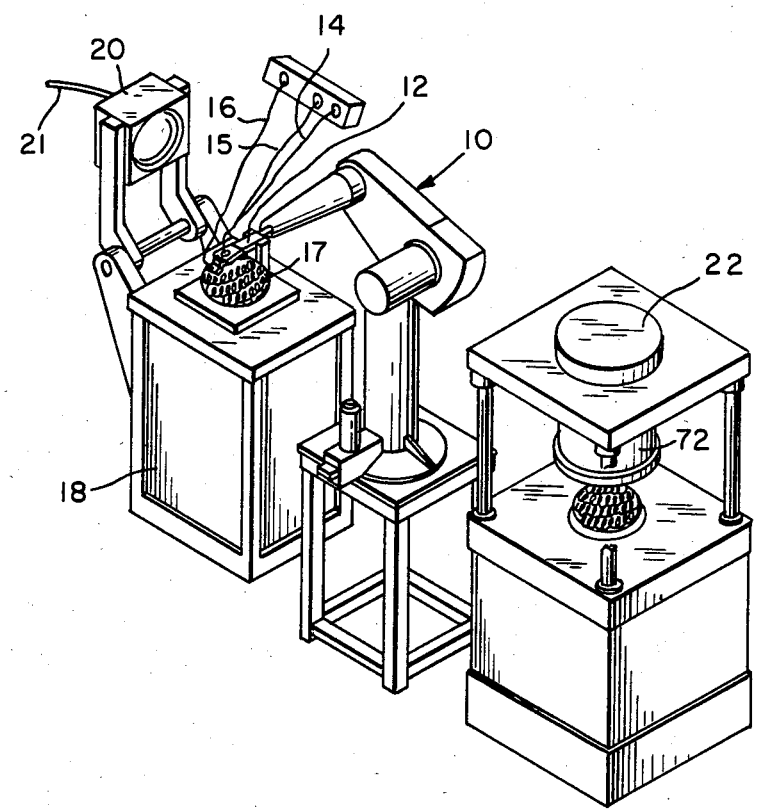
FIG. 1 is a schematic illustration of the apparatus of the present invention and associated equipment with which it is used in the fabrication of plastic composites.

Equipment for fabricating plastic helmets reinforced with fibers is shown in FIG. 1. On the arm of a robot 10, there is a winding head 12 through which synthetic filamentary yarns 14, 15, 16 are pulled from remote packages. Robot 10 functions as an automatic manipulator for moving head 12 relative to a contoured form 17 positioned on a stand 18. A heating fixture 20 for fusing the wound yarn at cross-over points is pivotally attached to the stand 18. Fixture 20 is connected to a source of heated air through conduit 21. A curing press for the fused preform is shown at 22.

Figure 2:
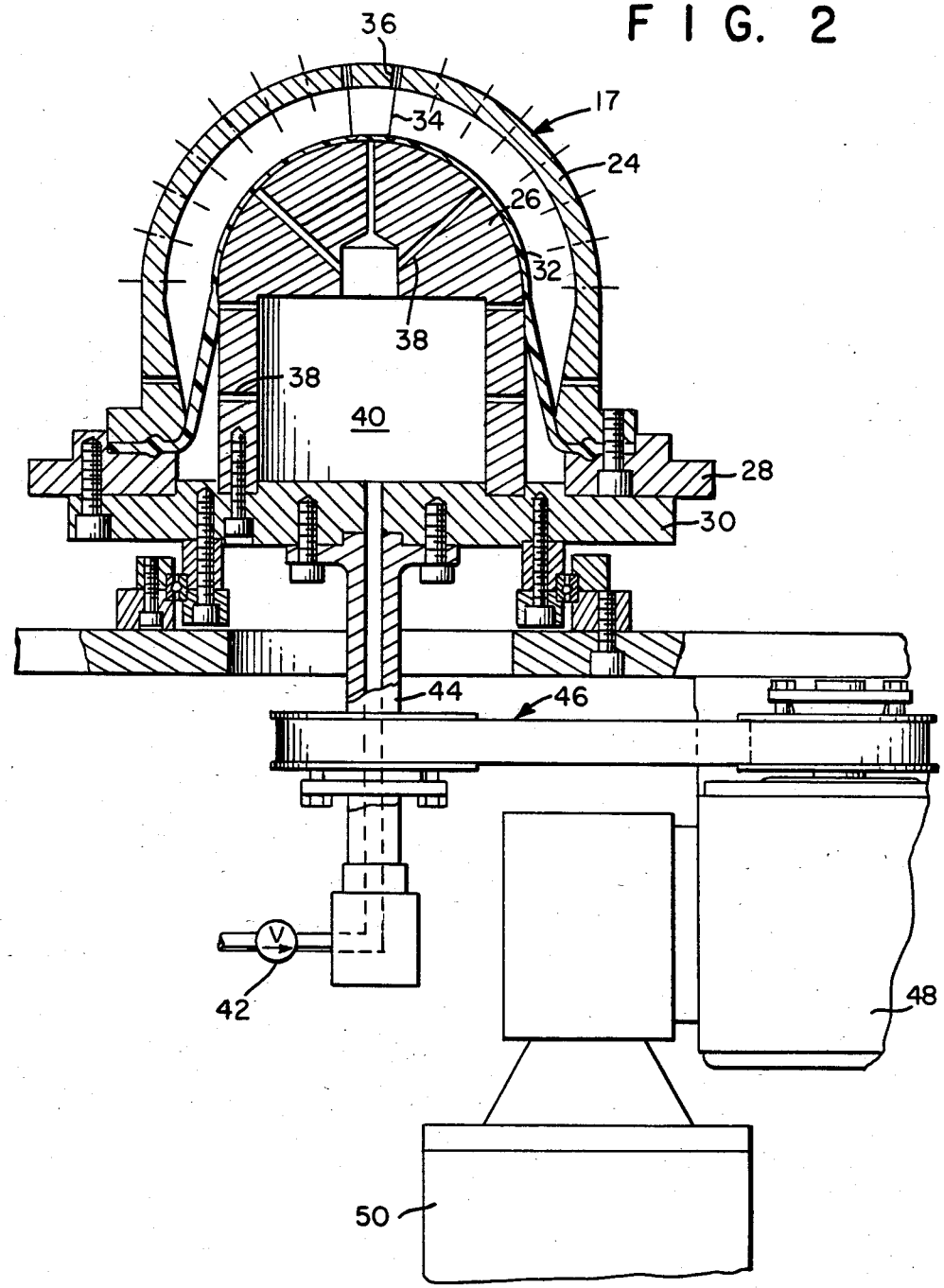
FIG. 2 is a sectional view through the form on which a strand is being deposited in FIG. 1.
Figure 3:
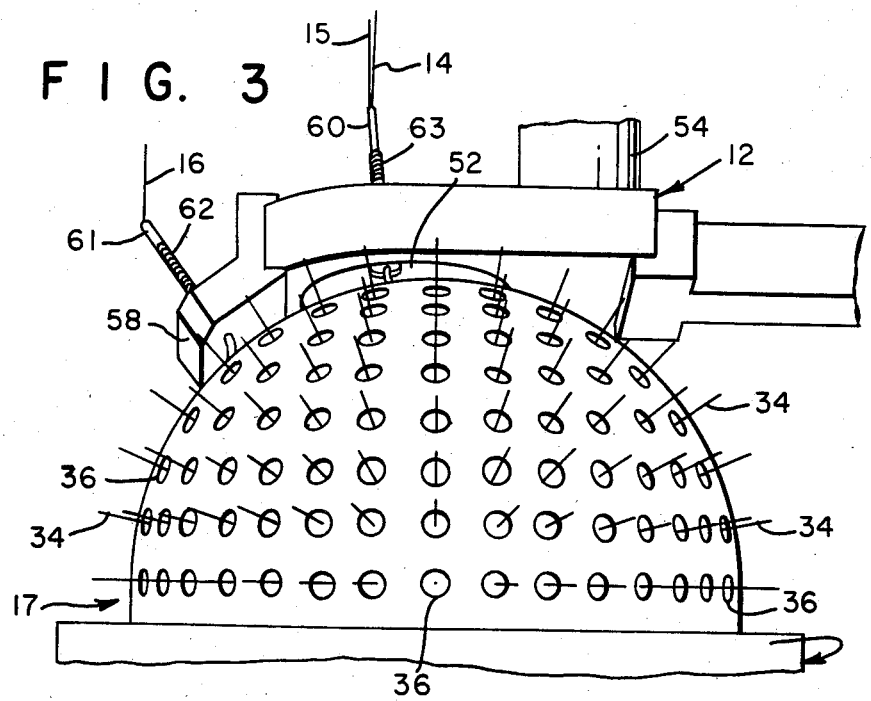
FIG. 3 is a side view of the form shown in FIG. 2 and the winding head shown in FIG. 1.

Referring now to FIGS. 2 and 3, form 17 has a convex, external surface defined by a hemispheric shell 24. Located within and spaced from bowl shaped shell 24, there is an inner form 26 which also has a convex exterior. Shell 24 is fastened to a ring 28 which, in turn, is fastened to a base plate 30. An elastomeric diaphragm 32, located in the cavity between inner form 26 and shell 24, has its peripheral edge clamped between ring 28 and a flange on the bottom of shell 24. A plurality of pins 34 are attached at one end to diaphragm 32 and project into multiple apertures 36 in shell 24.

Inner form 26 has multiple apertures 38 between its exterior and a cavity 40 which is in communication with a source of air under pressure through a valve 42 and a hollow shaft 44. Shaft 44 is fastened to base plate 30 and is rotatably driven, through a belt and pulley assembly 46 and a gear reducer 48, by a motor 50.

When pressure is applied to cavity 40, diaphragm 32 is inflated and pins 34 project from apertures 36 in shell 24, as shown in FIG. 3. The pins are deflectible by virtue of their attachment to the elastomeric diaphragm 32 and the relatively large size of apertures 36. The spacing between inner form 26 and shell 24 is such that the ends of the pins 34 are below the outer surface of shell 24 but still within apertures 36 when diaphragm 32 is deflated (FIG. 2).

Referring now to FIGS. 3-6, it will be seen that head 12 includes a rotor 52 that is driven by a motor 54 through a belt 56. Motor 54 has been omitted in FIG. 6. Head 12 carries an angularly disposed, end piece 58. A first strand-guiding tube 60 is located eccentrically in rotor 52 and a second tube 61 passes through end piece 58.

Figure 4:
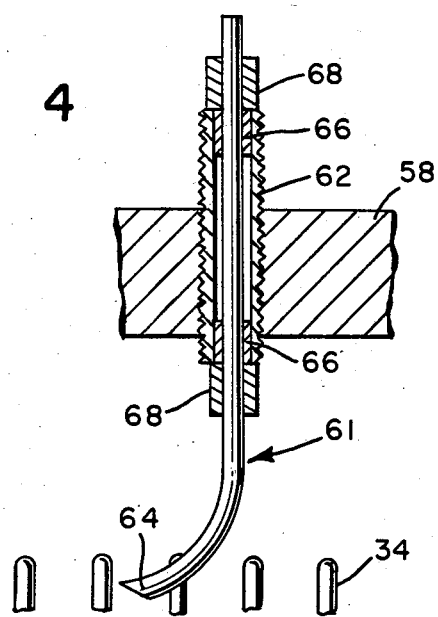
FIG. 4 is a sectional view through one of the strand-guiding tubes shown in FIG. 3.

As shown in FIG. 4, tube 61 has a straight length that extends through a threaded housing 62 and terminates in a curved length or horn 64. The straight length is freely rotatable in spaced sleeve bearings 66 in housing 62 and is retained by collars 68. Housing 62 is mounted in a threaded passage in end piece 58. Tube 60 is structurally the same as tube 61 and has its housing 63 in a threaded passage through rotor 52 (FIG. 6).

Figure 5:
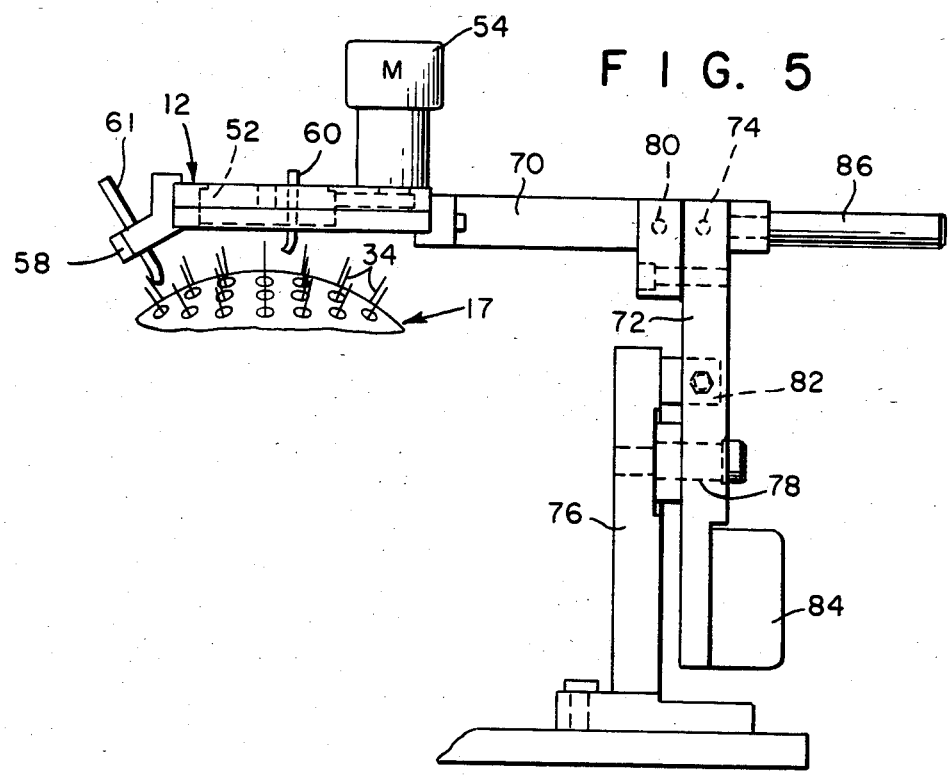

Referring to FIGS. 3 and 5, it will be seen that the pins 34 are arranged in rows extending around and across form 17 and present a densely packed bed. The pins are essentially rigid relative to forces applied by yarns 14, 15 but are deflectible by the greater force of the horns on tubes 60 and 61. The packing of the pins is sufficiently dense that the desired pattern can be wound from pin to pin with minimal distortions from true curves. In an operable embodiment, the apertures 36 are 858 in number, 0.250 inch in diameter and equally spaced on the surface of a hemisphere 8.0 inches in diameter.

Figure 6:
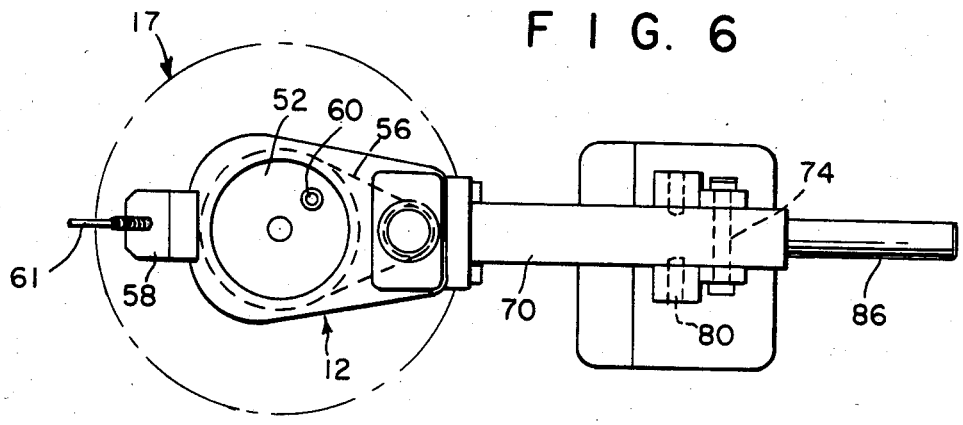
FIGS. 5 and 6 are side and top views, respectively, of the form, the winding head and a pivoted mount for the winding head.

A pivotal mount for winding head 12 is shown in FIGS. 5 and 6. Head 12 is attached to a first link 70 which, in turn, is joined to a second link 72 by a pivot pin 74. Link 72 is joined to a pedestal 76 by a pivot pin 78. Normally, movement between links 70, 72 is prevented by spring-biased detents 80. Swinging movement of link 72 in one direction beyond the top of form 17 is prevented by a stop 82. There is a counterweight 84 at the free end of link 72. At the free end of link 70, there is an extension 86 that is adapted for connection to the arm of robot 10.

The apparatus is readied for operation by swinging link 70 free from the restraints of detents 80 and moving head 12 upwardly through a small angle, about pin 74, to a position where yarns 14, 15, 16 can be threaded through tubes 60, 61. Preferably, one of the yarns 14, 15 is comprised of a material that can be thermally bonded to the other yarn and, under heat and pressure, form a matrix. The other and yarn 16 are of a "hard" fiber, i.e., one with a higher melting point and which can be molded without degrading. For example, filamentary yarns of a polyester and of Kevlar ® aramid fiber can be used, the latter being a "hard" fiber in this instance.

Air pressure is applied to inflate diaphragm 32 into engagement with shell 24 so that pins 34 will project from form 17. Then, each of the yarns is laid into the bed of pins 34 through a sufficient length to be held in place by friction. Link 70 is returned to its normal position where the rotational axis of rotor 52 is parallel to a radius of shell 24. Put differently, the axis of rotor 52 is perpendicular to the adjacent surface of form 17. In this position, the ends of horns 64 are beneath the tips of pins 34.

Under guidance of a programmed controller, motors 50, 54 and robot 10 are energized. The arm of the robot 10 is attached manually to extension 86 or programmed to pick it up automatically. As form 17 and rotor 52 rotate, yarns 14, 15, 16 are drawn from their packages. The ends of the horns on tubes 60, 61 are beneath the tips of pins 34. As form 17 rotates, the rotary movement of the tube 60 with rotor 52 causes a shingled series of loops (FIG. 1) to be deposited. The horn on the tube 60 trails the straight length, engages the preceding loop to push it down and is freely rotatable in either direction in its housing 63, depending on its location with respect to the pins it contacts. In addition, pins 34 are deflectible as the horn moves through the bed. Due to the resilience of their mounting, pins 34 spring back toward their normal position and hold yarns 14, 15 in a pattern of shingled loops. Yarns 14, 15 are anchored in the bed by frictional engagement with the pins and are pulled from their packages by the movements of form 17 and rotor 52. The horn on tube 60 dispenses yarns 14, 15 beneath the tops of the pins 34 and also engages preceding loops. This moves the loops inwardly to a position where, because of convergence of the pins 34 toward the convex surface of form 17, the loops tend to become loose or slack. Yarn 16 is pulled from its tube 61 and deposited in an essentially straight circumferential line and under sufficient tension to act as a cinch over loops previously deposited.

As the loops build on form 17, the robot 10 moves head 12 up or down one side of the form until sufficient layers of overlapped rows have been deposited. Successive rows of loops advance around the form in an overlapping spiral fashion, with each row cinched by the yarn 16. At the bottom edge of the pattern, chords are formed by the yarns 14, 15 where the freely rotatable tube 60 exits and reenters the bed of pins, leaving a smooth edge, i.e., there are no frayed edges which would require trimming. As layers of loops are built up in the bed of pins, they are pushed down to form 17 and compacted by the cinch yarns 16.

When the reinforcement has been wound to a sufficient number of layers and desired thickness, the motors are stopped and head 12 is tilted up to disengage horns 64 from pins 34. The yarns 14, 15, 16 are cut. Heating fixture 20 is placed over the wound structure of yarns which are held in place by pins 34 and cinching yarns 16. The yarns 16 debulk the structure and hold successive layers in contact. Fixture 20 is energized to fuse the lower melting yarn to the hard or higher melting yarns at points of cross-over and to thereby tack the structure together. In an operable embodiment, fixture 20 is connected to a source of heated air through the conduit 21.

Next, fixture 20 is swung away from the fused preform and pins 34 are retracted by deflating diaphragm 32. The fused preform has sufficient integrity to permit movement to the press 22. Press 22 includes an upper die 72 having a mold cavity contoured to form the outside of the final structure. Either a matching die or an inflatable elastomeric member is used to force the preform into the mold cavity. The loop pattern in the preform is sufficiently mobile to permit the final shaping and consolidation during a thermal cure in the mold. The cured structure may be a helmet or other contoured, reinforced, plastic composite. The cinch provided by yarn 16 not only assists in maintaining structural integrity of the contoured pattern but also contributes to the hoop strength of the final product.

If enough of the lower melting yarn has been provided, the thermal cure melts that component to form a matrix. Otherwise, a curable resin such as an epoxy or a polymer of methyl methacrylate can be added, as by spraying. Where only high melting yarns of a hard fiber, i.e., the reinforcement, are used, they can be precoated with a binding resin before being wound into the bed of pins or the binding resin can be sprayed on before the fusing step. In either event, sufficient binding resin to form the matrix of a composite structure must be added before the molding step.

Where used herein, the term "strand" is meant to identify a yarn of continous filaments or a yarn spun from staple fibers. It also denotes such a yarn combined with another of the same or a different composition. In the latter respect, filaments or fibers of graphite or an aramid are examples of suitable "hard" fiber and polyamides or polyesters are examples of the lower melting component.

I claim:

1. Apparatus for forming a reinforced composite structure comprising a hollow form having a contoured surface provided with multiple apertures, an inflatable elastic diaphragm within said form and multiple pins projecting from the diaphragm into said apertures, said pins projecting from the form when the diaphragm is inflated and presenting a densely packed bed into which a strand can be deposited according to a desired pattern, said apertures being larger than the pins, said pins thereby being deflectible, means for inflating said diaphragm, and means for laying strand between said pins.

2. The apparatus of claim 1 wherein an inner form is provided, said inner form having a contoured apertured surface, said means for inflating said diaphragm comprising means for placing the apertures in said inner form in communication with a source of fluid under pressure, said diaphragm being positioned between said forms.

3. In an apparatus for forming a contoured structure from a continuous strand,
   a hollow form having a similarly contoured surface provided with multiple apertures,
   an inflatable elastic diaphragm within said form,
   a plurality of pins projecting from the diaphragm into said apertures, means for inflating said diaphram and
means for laying strand between said pins,
said pins projecting from the form when the diaphragm is inflated and presenting a densely packed bed into which the strand can be deposited according to a desired pattern, said pins being substantially equispaced throughout said bed, said apertures being larger than the pins, said pins thereby being deflectible.

4. The apparatus of claim 3, said means for laying strand comprising a movable head including means for guiding a strand in its advance to said form.

5. The apparatus of claim 4 wherein said form a bowl-shaped surface and is mounted for rotation with respect to the head and wherein a drive is provided for rotating the form continuously as a strand is deposited.

6. The apparatus of claim 5 wherein an inner form is provided, said inner form having a convex apertured surface, said means for inflating said diaphragm comprising means for placing the apertures in said inner form in communication with a source of fluid under pressure, said diaphragm being located between said forms.

7. The apparatus of claim 3, said means for laying strand comprising a movable head having a freely rotatable, strand-guiding tube terminating at one end in a horn, said horn projecting into said bed and being adapted to deflect the pins it engages as a strand is deposited in said bed and wherin said form is bowl-shaped and mounted for rotation and a drive is provided for rotating the form continuously as a strand is deposited.

8. The apparatus of claim 7 wherein said head has an aperture extending therethrough and a driven rotor mounted in said aperture, said rotor having an eccentric passage therethrough, said tube being rotatably mounted in said passage.

9. The apparatus of claim 8 further comprising a second, strand-guiding tube on said head for depositing a cinch over said pattern.

* * * * *